(12) United States Patent
Murayama et al.

(10) Patent No.: US 9,794,436 B2
(45) Date of Patent: Oct. 17, 2017

(54) LABEL PREPARATION DEVICE

(71) Applicant: Seiko Epson Corporation, Tokyo (JP)

(72) Inventors: Noriaki Murayama, Azumino (JP);
Takeshi Hosokawa, Shiojiri (JP);
Masahiro Oida, Matsumoto (JP);
Yusuke Harigae, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/950,469

(22) Filed: Nov. 24, 2015

(65) Prior Publication Data

US 2016/0173713 A1 Jun. 16, 2016

(30) Foreign Application Priority Data

Dec. 12, 2014 (JP) .................... 2014-252301

(51) Int. Cl.
*H04N 1/00* (2006.01)
*B41J 3/407* (2006.01)

(52) U.S. Cl.
CPC ........ *H04N 1/00458* (2013.01); *B41J 3/4075* (2013.01); *H04N 1/00384* (2013.01); *H04N 2201/0096* (2013.01)

(58) Field of Classification Search
CPC combination set(s) only.
See application file for complete search history.

(56) References Cited

U.S. PATENT DOCUMENTS

| | | | |
|---|---|---|---|
| 6,879,989 B2* | 4/2005 | Cheng | H04L 67/1095 |
| 8,713,430 B2* | 4/2014 | Tonisson | G06F 17/211 |
| | | | 715/244 |
| 2008/0256066 A1* | 10/2008 | Zuckerman | G06F 17/24 |
| 2013/0058696 A1* | 3/2013 | Murayama | B41J 3/4075 |
| | | | 400/325 |

FOREIGN PATENT DOCUMENTS

JP 2013-58041 A 3/2013

* cited by examiner

*Primary Examiner* — Barbara Reinier
(74) *Attorney, Agent, or Firm* — ALG Intellectual Property, LLC (57) ABSTRACT

A label preparation device includes: an editing target switching unit which switches an editing target label among a plurality of labels arranged in particular order, in response to an operation on a keyboard; and an editing screen display unit which displays an editing screen including a preview image of the editing target label. If there is a label immediately preceding the editing target label in the order, the editing screen display unit displays a left arrow object on a forward end side of the preview image. If there is a label immediately following the editing target label in the order, the editing screen display unit displays a right arrow object on a rear end side of the preview image.

5 Claims, 8 Drawing Sheets

LABEL PREPARATION DEVICE

CROSS-REFERENCE TO RELATED APPLICATION

The entire disclosure of Japanese Patent Application No. 2014-252301, filed Dec. 12, 2014 is expressly incorporated by reference herein.

BACKGROUND

1. Technical Field

The present invention relates to a label preparation device which can edit the print content of each of a plurality of labels and prepares a plurality of labels on the basis of the editing result of the print content of each label.

2. Related Art

According to the related art, as a label preparation device (tape printing device), a device including: a keyboard having various input keys; a display screen which display an editing result (document) based on input information inputted via the keyboard, and a preview image (print preview) based on the editing result; a print unit which executes printing on a print tape on the basis of the editing result; and a cutting unit which cuts the printed part of the print tape, is known (see JP-A-2013-58041). In this tape printing device, the printing unit performs printing on the print tape and subsequently the cutting unit cuts the printed part, thus preparing a strip-like label.

Meanwhile, there is a demand for collective preparation of a plurality of labels with different print contents in the label preparation device of this type. That is, in the case of preparing a plurality of labels with different print contents by an existing method, editing of the print content and label preparation processing based on the editing result (print processing and cutting processing) are to be carried out for each label, which makes the label preparation work very complex. Therefore, there is a demand for collective editing of the print contents of a plurality of labels and collective implementation of label preparation processing based on each editing result.

To address this, it is conceivable that the print content of each of a plurality of labels is displayed in a text format in an editable manner and then the plurality of labels is prepared on the basis of the editing result of the print content of each label. However, with such a configuration, since the print content is displayed in a text format, the user has no other choice than to edit the print content, imagining the label to be prepared as a result. This poses the problem that it is difficult to prepare a desired label. Thus, it is proposed that a preview image of each of a plurality of labels should be displayed. However, such a configuration has the problems that the generation processing for a plurality of preview images strains the memory capacity in the label preparation device and that the display screen needs to be increased as not all the preview images can be displayed on the existing display screen.

To cope with these problems, the present inventors have thought of displaying only the preview image of the label currently being edited (editing target) while omitting the display of the preview images of the other labels. However, with a configuration in which only the preview image of the label currently being edited is simply displayed, what number the label currently being edited with a preview image being displayed is, or whether there is any label preceding or following the label in question in the order, cannot be intuitively grasped. This poses the problem that the editing work on each label cannot be carried out smoothly.

SUMMARY

An advantage of some aspects of the invention is to provide a label preparation device which can collectively prepare a plurality of labels with different print contents and which enables the user to intuitively and easily grasp whether or not there is any label preceding or following, in the order, the label currently being edited with a preview image being displayed.

A label preparation device according to an aspect of the invention is a label preparation device which can edit a print content of each of a plurality of labels and which prepares the plurality of labels on the basis of an editing result of the print content of each label, and includes: an operation unit; an editing target switching unit which switches an editing target label among the plurality labels arranged in particular order, in response to an operation on the operation unit; and an editing screen display unit which displays an editing screen including a preview image of the editing target label. If there is a label immediately preceding the editing target label in the order, the editing screen display unit displays a first object indicating that there is an immediately preceding label in the order, on a forward end side of the preview image. If there is a label immediately following the editing target label in the order, the editing screen display unit displays a second object indicating that there is an immediately following label, on a rear end side of the preview image.

According to this configuration, if there is a label immediately preceding the editing target label in the order, a first object is displayed on the forward end side of the preview image. If there is a label immediately following the editing target label in the order, a second object is displayed on the rear end side of the preview image. Since a specific object is displayed on the forward end side or rear end side of the preview image according to whether there is a preceding or following label in the order, the user can intuitively and easily grasp whether or not there is a label preceding or following, in the order, the label currently being edited with a preview image being displayed. Therefore, the editing work on each label can be carried out smoothly and the label preparation work can be carried out smoothly.

In this case, it is preferable that the editing screen display unit displays a cursor indicating an editing position on the print content in the editing screen, and that the operation unit includes a first cursor key which moves the cursor in a forward end direction of the print content, and a second cursor key which moves the cursor in a rear end direction of the print content. It is preferable that when the first cursor key is pressed in the state where the cursor is at a forward end position on the print content, if there is a label immediately preceding the editing target label, the editing target switching unit switches the editing target label to the immediately preceding label, and that when the second cursor key is pressed in the state where the cursor is at a rear end position on the print content, if there is a label immediately following the editing target label, the editing target switching unit switches the editing target label to the immediately following label.

According to this configuration, the editing target label can be switched with an intuitive operation using the cursor keys. Thus, the editing work on each label can be carried out more smoothly.

Also, it is preferable that the label preparation device further includes an editing result reflection unit which reflects an editing result of the print content of a first label in the order, of the plurality of labels, onto the print contents of the other labels.

According to this configuration, the editing result on the first label is reflected on the other labels, the editing result on the first label is displayed as an initial value when carrying out the editing work on the second label and onward. In many cases where a plurality of labels is collectively prepared, labels with similar print contents are prepared. Therefore, such a configuration can simplify the editing work on the second label and onward. For example, in the case of preparing three labels with print contents "ABC7", "ABC26" and "ABC33", respectively, if the print content of the first label is edited to "ABC7", the print contents of the second label and the third label temporarily become "ABC7" as well. In this case, the editing work on the second label only has to modify "7" to "26", and the editing work on the third label only has to modify "7" to "33". Thus, the editing work on the second label and onward can be simplified and the label preparation work can be carried out more smoothly.

It is also preferable that the editing screen display unit displays the print content of the label preceding or following the editing target label in the order, with the preview image, in the editing screen.

According to this configuration, since the print content of the label preceding or following the label currently being edited is displayed with the preview image, the user can grasp not only whether or not there is a preceding or following label but also the print content of the preceding or following label. Also, since whether or not there is a preceding or following label can be grasped both from the display of the object and from the display of the print content, whether or not there is preceding or following label can be grasped more easily and the editing work on each label can be carried out more smoothly.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a label preparation device according to an embodiment of the invention will be described with reference to the accompanying drawings. This label preparation device performs printing on a long print tape and cuts the printed part of the print tape, thus preparing a label (tape strip). Particularly, this label preparation device has a function that enables collective preparation of a plurality of labels with different print contents (hereinafter referred to as a strip printing function).

Figure 1:
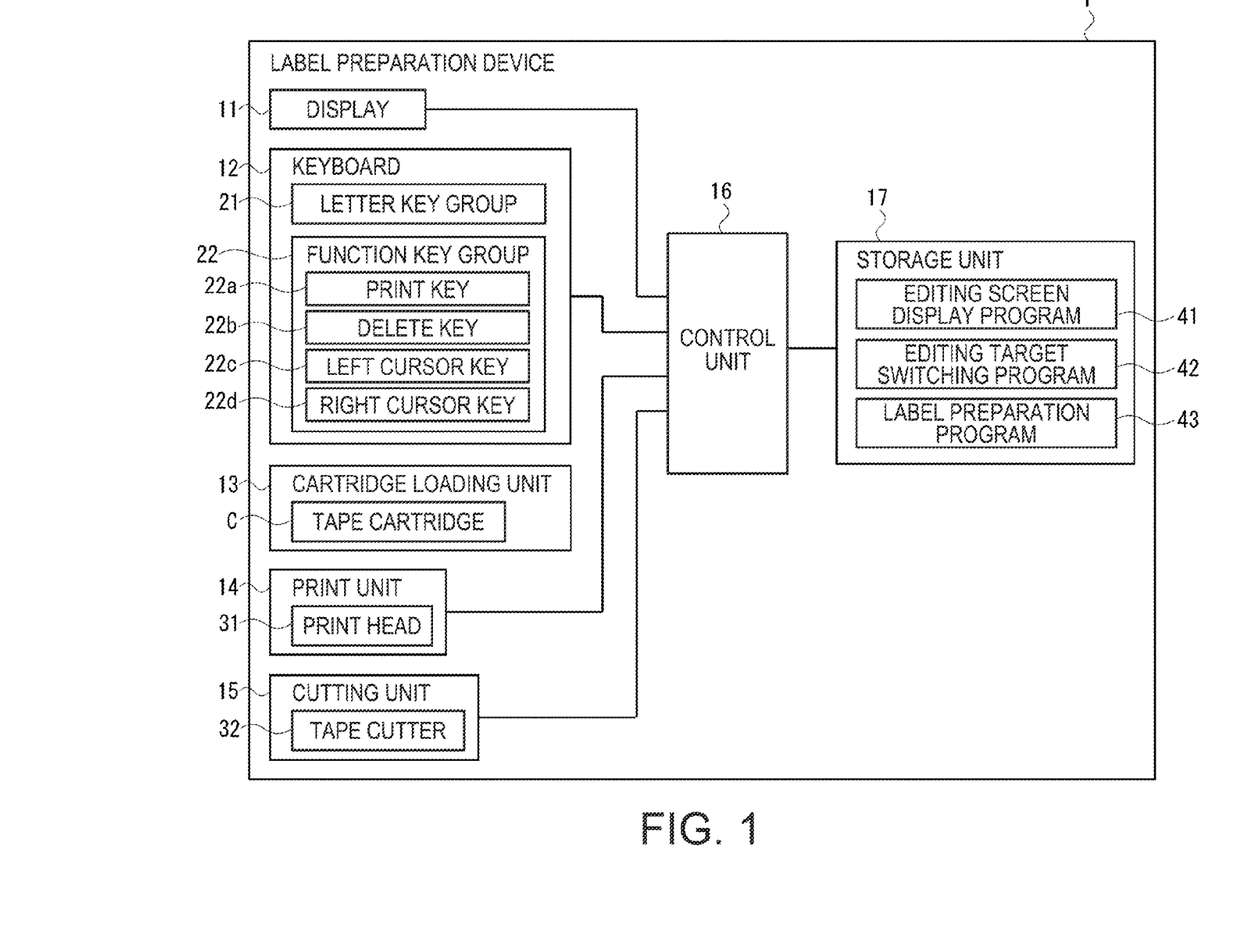
FIG. 1 is a block diagram showing the configuration of a label preparation device according to a first embodiment.

As shown in FIG. 1, a label preparation device 1 includes a display 11, a keyboard 12, a cartridge loading unit 13, a print unit 14, a cutting unit 15, a control unit 16, and a storage unit 17.

Figure 2A:
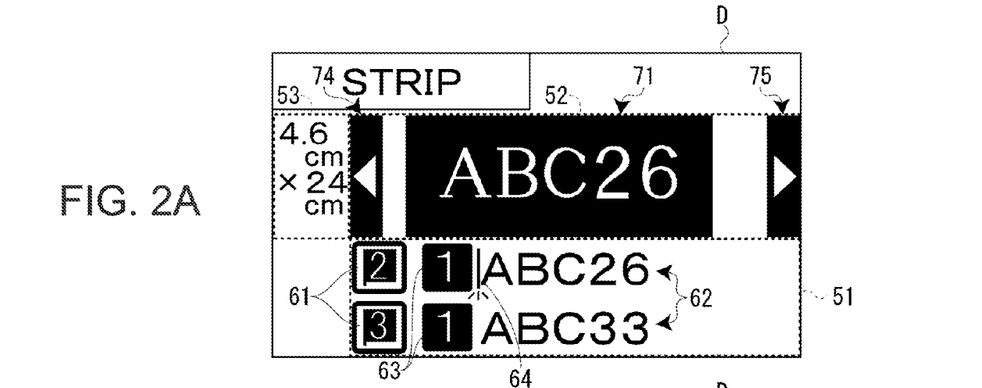
FIGS. 2A to 2C show an editing screen for the strip printing function.

The display 11 is configured to display various kinds of information related to the preparation of labels and mainly displays an editing screen D for editing print contents 62 of labels (see FIG. 2A). The editing screen D shown in FIG. 2A is an editing screen for a strip printing function.

The keyboard 12 is an operation unit for carrying out various operations and functions as an editing unit for editing the print contents 62 on the editing screen D. The keyboard 12 includes a letter key group 21 for inputting letters, and a function key group 22. The function key group 22 includes a print key 22a, a delete key 22b, a left cursor key 22c (first cursor key) and a right cursor key 22d (second cursor key), or the like.

In the cartridge loading unit 13, a tape cartridge C accommodating a long print tape is removably loaded. The print tape accommodated in the tape cartridge C is made up of a recording tape to have a print image formed on the front surface thereof, and a release tape attached to the back surface of the recording tape via an adhesive layer. A label prepared from the print tape is used by having the release tape part stripped off the recording tape part and then having the recording tape part bonded to an object via the adhesive layer.

The print unit 14 has a print head 31 and performs printing on the print tape reeled off from the tape cartridge C. This printing forms a print image on the front surface of the recording tape. Meanwhile, the cutting unit 15 has a tape cutter 32 and cuts the printed part of the print tape. In this way, in this label preparation device 1, the print unit 14 performs printing on the print tape and the cutting unit 15 cuts (separates) the printed part, thus preparing a label.

The control unit 16 includes a CPU (central processing unit), a ROM (read only memory), a RAM (random access memory) and the like, and centrally controls the entirety of the label preparation device 1. The control unit 16 executes each program stored in the storage unit 17 and thereby controls each part of the label preparation device 1.

The storage unit 17 is made up of a flash ROM or the like. The storage unit 17 stores an editing screen display program 41, an editing target switching program 42, and a label preparation program 43, as programs involved in the strip printing function. The editing screen display program 41 is a program for displaying the editing screen D for the strip printing function on the display 11 and for causing the transition of the editing screen D. The editing target switching program 42 is a program for switching the editing target label in the editing on the editing screen D. The label preparation program 43 is a program for controlling the print unit 14 and the cutting unit 15 to perform print processing and cutting processing on the basis of the editing result on the editing screen D. In this embodiment, these programs are executed by the control unit 16, thus realizing the strip printing function. Here, before explaining details of each program, the editing screen D and the way the editing screen D makes transition will be described.

As shown in FIG. 2A, the editing screen D for the strip printing function includes a print content display area 51 arranged in a lower part of the screen, a preview display area 52 arranged above the print content display area 51, and a dimension display area 53 arranged to the left of the preview display area 52. The print content display area 51 is a display area for displaying the print content 62 of each label. The preview display area 52 is a display area for displaying a preview image 71 (print preview) of the label that is the editing target. The dimension display area 53 is a display area for displaying the dimensions (tape width and tape length) of the label that is the editing target. As described above, with the strip printing function, a plurality of labels can be prepared collectively, and the print contents of a plurality of labels to be prepared can be edited on the editing screen D. The plurality of labels to be prepared are arranged in particular order and label numbers 61 are given (set) to these labels, as a matter of convenience in label preparation. FIG. 2A shows an example in which, of the three labels to be prepared, the second label in the order is the editing target.

In the print content display area 51, the print content 62 of each label and the label number 61 of each label are displayed. In the print content display area 51, the print content 62 of each label is displayed in a text format in an editable manner.

Also, in the print content display area 51, only two lines of letter strings can be displayed as the print contents 62 because of the size of the print content display area 51. Therefore, in the example of FIG. 2A, only the print content 62 of the second label, which is the editing target, and the print content 62 of the subsequent third label are displayed. However, scrolling up and down from the editing target label as a reference enables confirmation of the print contents 62 of all the labels to be prepared. In the example of FIG. 2A, a print content 62 made up of one line is provided as an example and the print content 62 is displayed in one line. However, if a print content 62 is made up of a plurality of lines, the print content 62 is displayed in a plurality of lines. For example, if the second label in the example of FIG. 2A has a print content 62 made up of two lines, the print content 62 is displayed in two lines. As a result, the number of lines that can be displayed is used up by the print content 62 of the second label alone. Therefore, only the print content 62 of the second label is displayed. Symbols 63 are line numbers indicating each line.

In the print content display area 51, a cursor 64 indicating the editing position on the print content 62 is displayed in the state of blinking on the print content 62 of the editing target label. The left cursor key 22*c* is a key for moving this cursor 64 in the forward end direction (left direction) of the print content 62. The right cursor key 22*d* is a key for moving the cursor 64 in the rear end direction (right direction) of the print content 62. That is, if the left cursor key 22*c* or the right cursor key 22*d* is pressed, the cursor 64 accordingly moves on the print content 62 and thus can change the editing position to the left or right. If a letter is inputted by an operation on the letter key group 21, the inputted letter is accordingly inserted to the rear side from the position of the cursor 64. If the delete key 22*b* is pressed, the letter on the forward side from the position of the cursor 64 is deleted. In this way, the user can edit the print content 62 of the editing target label by operating the letter key group 21 and the delete key 22*b* while changing the editing position with the use of the cursor keys 22*c*, 22*d*.

Figure 2B:
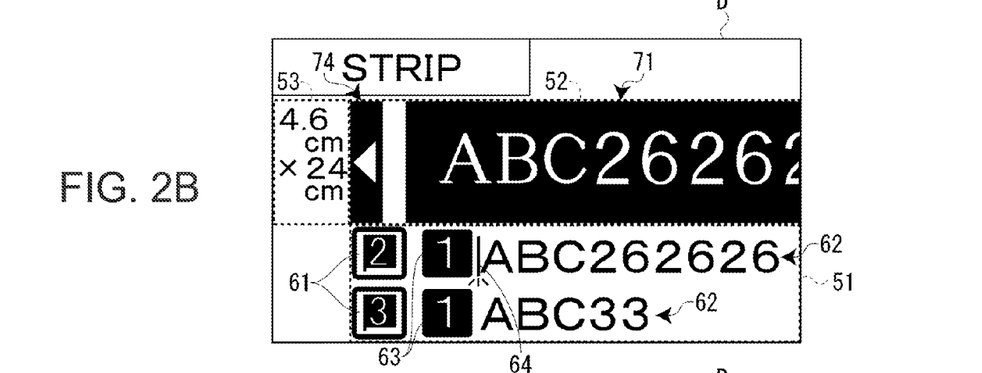
Figure 2C:
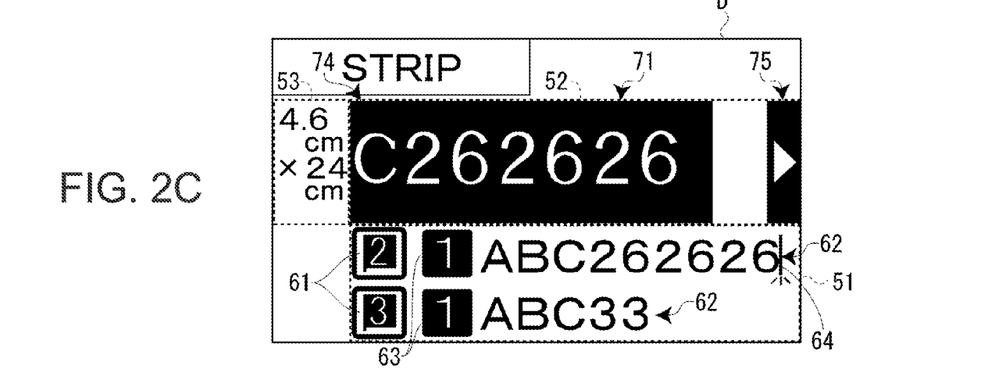

Meanwhile, in the preview display area 52, the preview image 71 of the editing target label is displayed. The preview image 71 is made up of print data based on the editing result of the print content 62 (solid-white letters) superimposed on a tape image that is an image of a cut print tape (tape strip) (black area). The preview image 71 is displayed in a scrollable manner according to the position of the cursor 64, in the preview display area 52. As shown in FIGS. 2B and 2C, if the size of the preview image 71 is larger than the preview display area 52, scrolling the preview image 71 enables confirmation of the entirety of the preview image 71.

In the preview display area 52, if there is a label immediately preceding the editing target label in the order, a left arrow object 74 (first object) is displayed on the left side (forward end side) of the preview image 71. The left arrow object 74 is an arrow object pointing to the left which indicates that there is an immediately preceding label. Meanwhile, if there is a label immediately following the editing target label in the order, a right arrow object 75 (second object) is displayed on the right side (rear end side) of the preview image 71. The right arrow object 75 is an arrow object pointing to the right which indicates that there is an immediately following label in the order. The display of the arrow objects 74, 75 enables confirmation of whether there is a label preceding or following the editing target label in the order.

The display positions of the arrow objects 74, 75 are superimposed on the area where the preview image 71 can be displayed. Therefore, as shown in FIGS. 2B and 2C, if the preview image 71 is large and the preview image 71 overlaps with the display positions of the arrow objects 74, 75, the arrow objects 74, 75 are not displayed. That is, the display condition for the left arrow object 74 is that there is a label immediately preceding the editing target label in the order and that the preview image 71 does not overlap with the display position of the left arrow object 74. The display condition for the right arrow object 75 is that there is a label immediately following the editing target label in the order and that the preview image 71 does not overlap with the display position of the right arrow object 75.

Next, back to FIG. 1, details of the editing screen display program 41, the editing target switching program 42 and the label preparation program 43 will be described. The editing screen display program 41 is a program for displaying the editing screen D for the strip printing function on the display 11 and for causing the transition of the editing screen D in response to an operation on the keyboard 12 or a switching of the editing target via the editing target switching program 42. That is, the control unit 16, according to the editing screen display program 41, displays the editing screen D on the display 11 and causes the transition of the editing screen D as described above in response to an operation on the keyboard 12 or a switching of the editing target. In this way, the "editing screen display unit" is made up of the display 11, the control unit 16 and the editing screen display program 41.

The editing target switching program 42 is a program for switching the editing target label among a plurality of labels to be prepared, in response to an operation on the keyboard 12. That is, the control unit 16, according to the editing target switching program 42, switches the editing target label among a plurality of labels to be prepared, in response to an operation on the keyboard 12. In this way, the "editing target switching unit" is made up of the control unit 16 and the editing target switching program 42.

In this embodiment, a configuration in which the editing target label is switched when the left cursor key 22c or the right cursor key 22d is pressed under a specific condition is employed. Specifically, when the left cursor key 22c is pressed in the state where the cursor 64 is at the forward end position (leftmost end) of the print content 62, if there is a label immediately preceding the editing target label in the order, the editing target label is switched to the immediately preceding label. Meanwhile, when the right cursor key 22d is pressed in the state where the cursor 64 is at the rear end position (rightmost end) of the print content 62, if there is a label immediately following the editing target label in the order, the editing target label is switched to the immediately following label. By carrying out the switching processing with this method, it is possible to intuitively switch the editing target label.

The label preparation program 43 is a program for controlling the print unit 14 and the cutting unit 15 to perform print processing and cutting processing on the basis of the editing result of the print content 62 of each label on the editing screen D. That is, the control unit 16, according to the label preparation program 43, controls the print unit 14 and the cutting unit 15 to perform print processing and cutting processing on the basis of the editing result of the print content 62 of each label on the editing screen D. Specifically, in response to a press on the print key 22a, generation of print data based on the editing result, printing of the print data on a print tape, and cutting of the print tape to a tape length based on the editing result are carried out for each label to be prepared. Thus, a plurality of labels based on the editing result of the print content 62 of each label is prepared.

Next, the label preparation operation with the strip printing function, and the screen transition during the label preparation operation will be described with reference to FIGS. 3A to 3C and FIGS. 4D to 4F. FIGS. 3A to 3C and FIGS. 4D to 4F are screen transition views showing an example of transition of the editing screen D in the label preparation operation. In the example below, it is assumed that three labels whose print contents 62 are "ABC7", "ABC26" and "ABC33", respectively, are prepared. In this label preparation operation, it is also assumed that, in response to an operation on the keyboard 12, a strip printing mode using the strip printing function is selected as a print mode and therefore a shift to the strip printing mode is made.

Figure 3A:
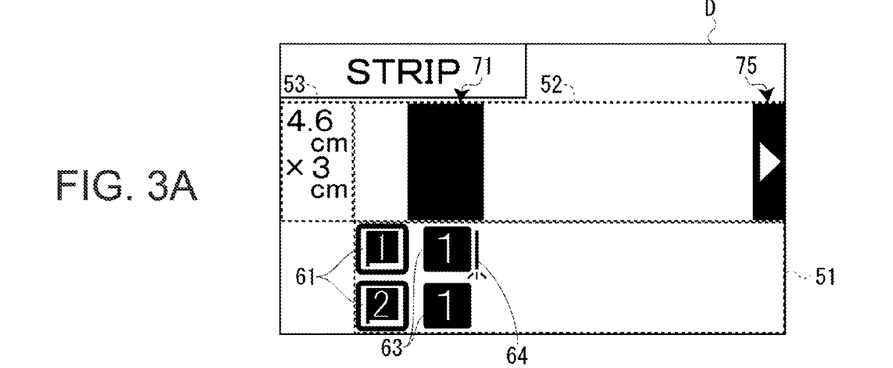
FIGS. 3A to 3C are screen transition views showing an example of transition of the editing screen in the former half of the label preparation operation in the first embodiment.

As shown in FIG. 3A, as the shift to the strip printing mode is made, the control unit 16 displays the editing screen D for the strip printing function, according to the editing screen display program 41. In initial state where the editing screen D is displayed, the first label is the editing target and the print content 62 of the first label is in an editable state (where the print content can be inputted). The preview image 71 based on the print content 62 of the first label is generated and this preview image is displayed in the preview display area 52. Since there is no input of the print content 62 of the first label at this point, only a tape image is displayed as the preview image 71. Moreover, since there is a label immediately following the first label in the order, the right arrow object 75 is displayed in the preview display area 52. It is assumed that the user inputs "ABC7" with the use of the letter key group 21 at this point.

Figure 3B:
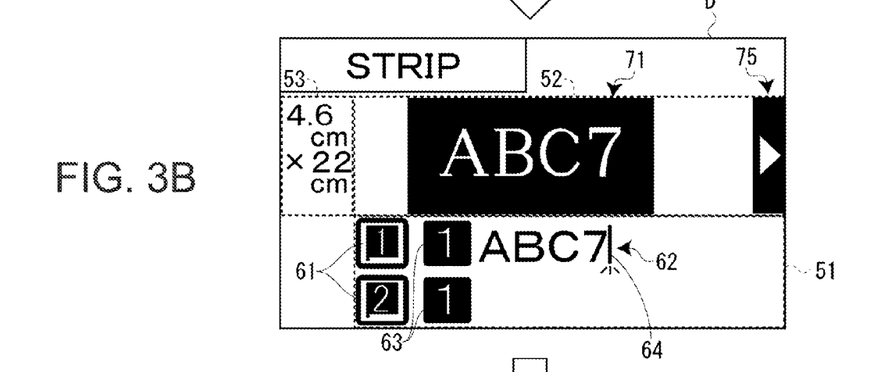

As shown in FIG. 3B, as "ABC7" is inputted, the control unit 16 in response to this causes the transition of the editing screen D according to the editing screen display program 41. Specifically, this input content ("ABC7") is reflected on the print content 62 of the first label in the print content display area 51, and this editing result is reflected on the preview image 71 as well. That is, the preview image 71 of the label with "ABC7" is generated and this preview image is displayed in the preview display area 52. At this point, the cursor 64 is at the rear end of the print content 62 ("ABC7"). It is assumed that the user presses the right cursor key 22d at this point.

Figure 3C:
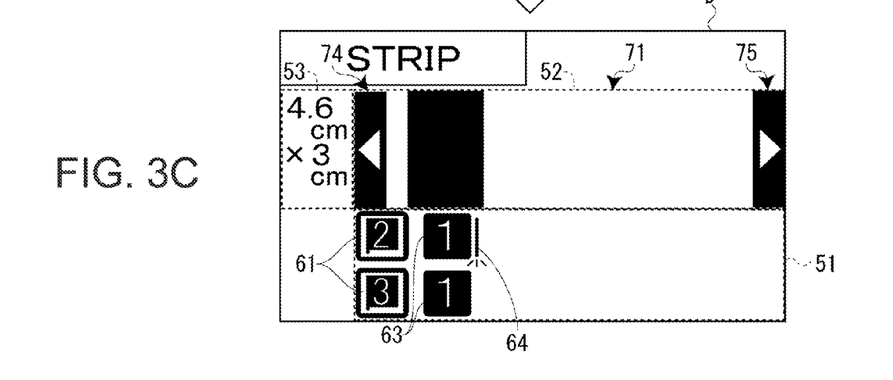

As the right cursor key 22d is pressed, since the cursor 64 is at the rear end of the print content 62 and there is an immediately following label in the order, the control unit 16 switches the editing target to the second label according to the editing target switching program 42. Thus, the print content 62 of the second label becomes editable. As shown in FIG. 3C, as the editing target is switched, the control unit 16 in response to this causes the transition of the editing screen D according to the editing screen display program 41. Specifically, the display in the print content display area 51 is scrolled in such a way that the print content 62 of the second label comes to the uppermost part. Then, the preview image 71 of the second label is generated and this replaces the preview image 71 of the first label. Since there is no input of the print content 62 of the second label at this point, only a tape image is displayed as the preview image 71. Since there is a label immediately preceding the second label in the order and there is a label immediately following the second label in the order, the left arrow object 74 and the right arrow object 75 are displayed in the preview display area 52. It is assumed that the user inputs "ABC26" with the use of the letter key group 21 at this point.

Figure 4D:
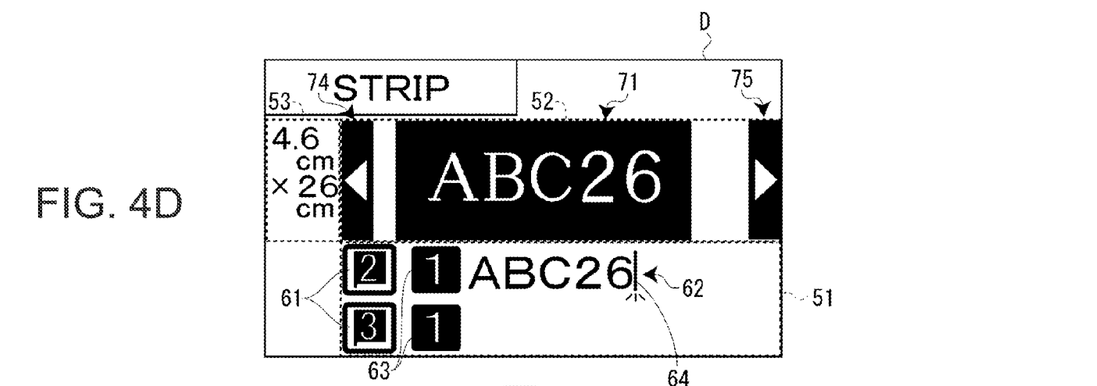
FIGS. 4D to 4F are screen transition views showing an example of transition of the editing screen in the latter half of the label preparation operation in the first embodiment.

As shown in FIG. 4D, as "ABC26" is inputted, the control unit 16 causes the transition of the editing screen D according to the editing screen display program 41, as in the case of the first label. Specifically, this input content ("ABC26") is reflected on the print content 62 of the second label in the print content display area 51, and this editing result is reflected on the preview image 71 as well. That is, the preview image 71 of the label with "ABC26" is generated and this preview image is displayed in the preview display area 52. At this point, the cursor 64 is at the rear end of the print content 62. It is assumed that the user presses the right cursor key 22d at this point.

Figure 4E:
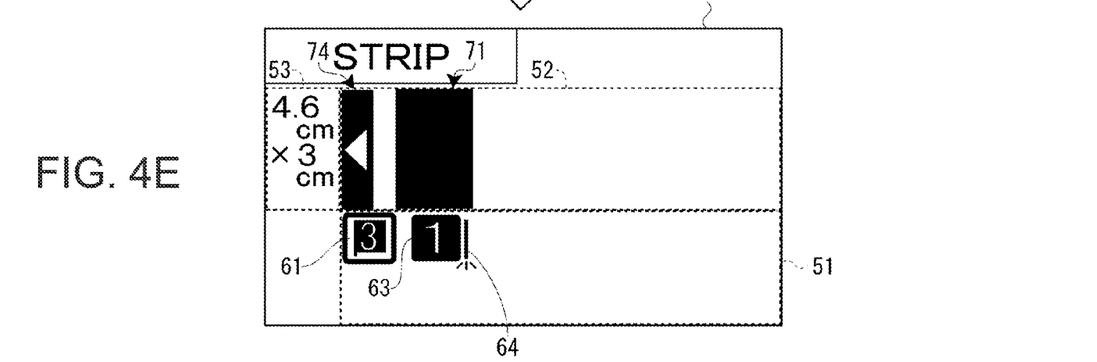

As the right cursor key 22d is pressed, since the cursor 64 is at the rear end of the print content 62 and there is an immediately following label in the order, the control unit 16 switches the editing target to the third label according to the editing target switching program 42. As shown in FIG. 4E, as the editing target is switched, the control unit 16 in response to this causes the transition of the editing screen D according to the editing screen display program 41, as in the case where the editing target is switched to the second label. Specifically, the display in the print content display area 51 is scrolled in such a way that the print content 62 of the third label comes to the uppermost part. Then, the preview image 71 of the third label is generated and this replaces the preview image 71 of the second label. Since there is no input of the print content 62 of the third label at this point, only a tape image is displayed as the preview image 71. Also, since there is a label immediately preceding the third label in the order, the left arrow object 74 is displayed in the preview display area 52. It is assumed that the user inputs "ABC33" with the use of the letter key group 21 at this point.

Figure 4F:
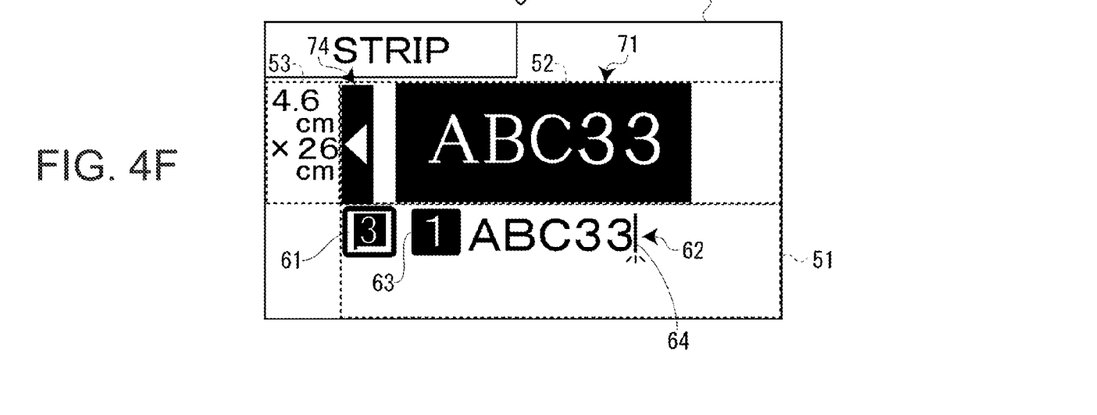

As shown in FIG. 4F, as "ABC33" is inputted, the control unit 16 causes the transition of the editing screen D according to the editing screen display program 41, as in the cases of the first and second labels. Specifically, this input content ("ABC33") is reflected on the print content 62 of the third label in the print content display area 51, and this editing result is reflected on the preview image 71 as well. That is, the preview image 71 of the label with "ABC33" is generated and this preview image is displayed in the preview display area 52. It is assumed that the user presses the print key 22a at this point.

As the print key 22a is pressed, the control unit 16 controls the print unit 14 and the cutting unit 15 to perform print processing and cutting processing on the basis of the editing results of the respective print contents 62 ("ABC7", "ABC26", "ABC33") on the editing screen D, according to the label preparation program 43. That is, print data based on the editing result is generated for each label and the generated print data is printed on a print tape. Moreover, the print tape is cut to a tape length based on the editing result. Thus, three labels with "ABC7", "ABC26" and "ABC33" printed thereon, respectively, are prepared. This label preparation operation ends here.

Second Embodiment

Now, a second embodiment of the invention will be described with reference to FIGS. 5 to 7F. Only the difference from the first embodiment will be described. In the second embodiment, considering that, in many cases, the user prepares labels with similar print contents 62 when collectively preparing a plurality of labels, the print content 62 inputted on the first label (editing result) is reflected on the print contents 62 of the second label and onward, thus simplifying the editing work on the second label and onward.

Figure 5:
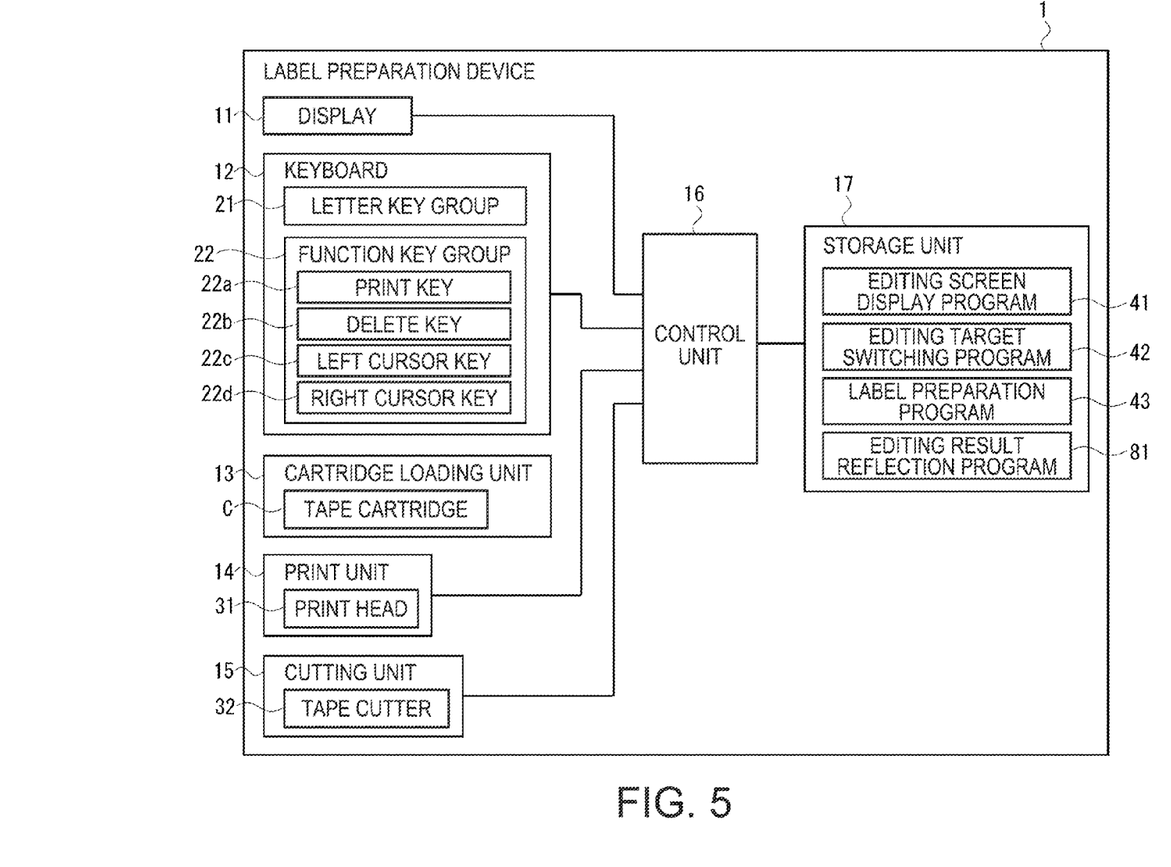
FIG. 5 is a block diagram showing the configuration of a label preparation device according to a second embodiment.

As shown in FIG. 5, in the label preparation device 1 according to the second embodiment, the storage unit 17 stores an editing result reflection program 81 in addition to the respective programs shown in FIG. 1. The editing result reflection program 81 is a program for reflecting the editing result of the print content 62 of the first label in the order, of a plurality of labels to be prepared in the strip printing function, onto the print contents 62 of the other labels (second label and onward). That is, the control unit 16 reflects the editing result of the print content 62 of the first label on the print contents 62 of the second label and onward, according to the editing result reflection program 81. In this way, the "editing result reflection unit" is made up of the control unit 16 and the editing result reflection program 81.

Figure 6A:
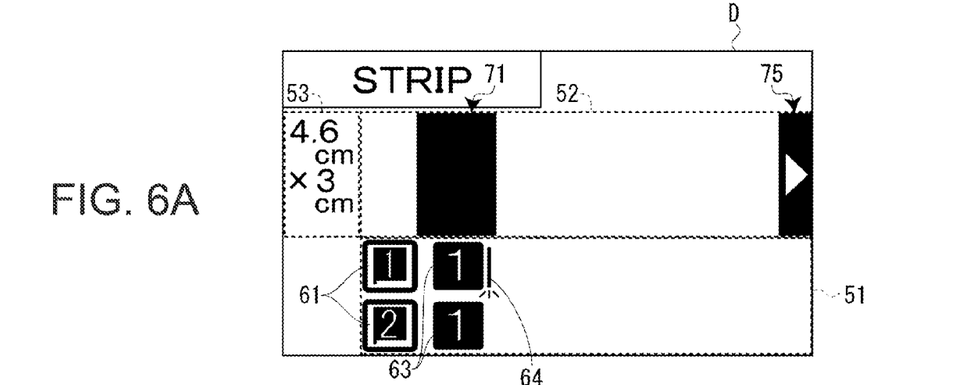
FIGS. 6A to 6C are screen transition views showing an example of transition of the editing screen in the former half of the label preparation operation in the second embodiment.
Figure 6B:
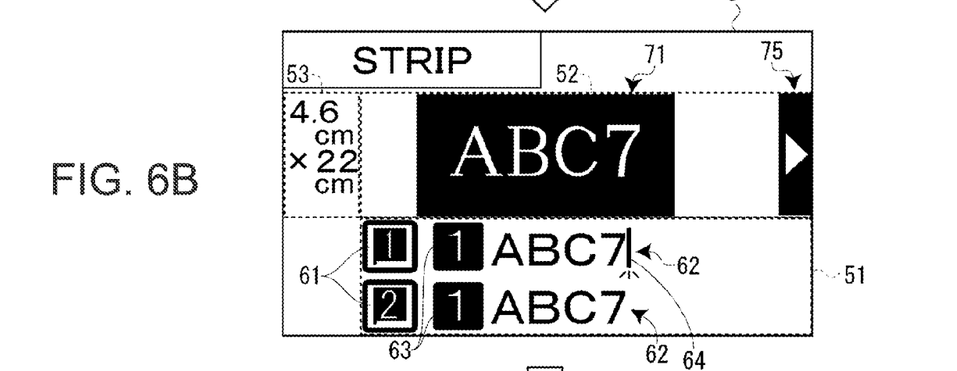
Figure 6C:
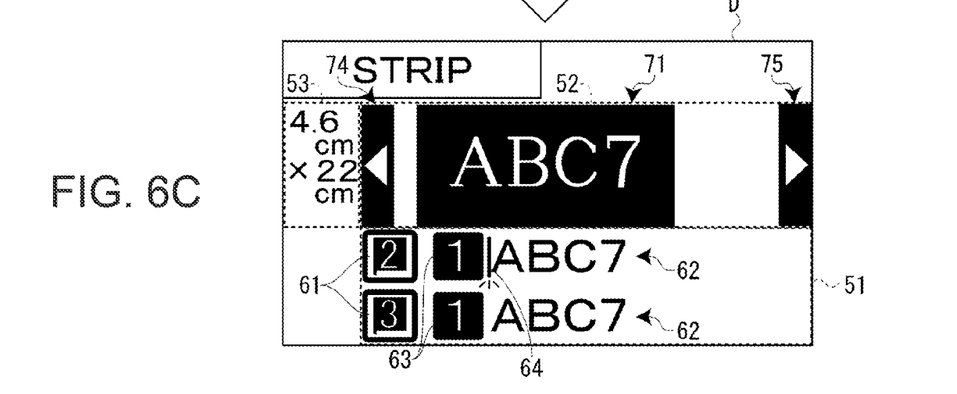
Figure 7D:
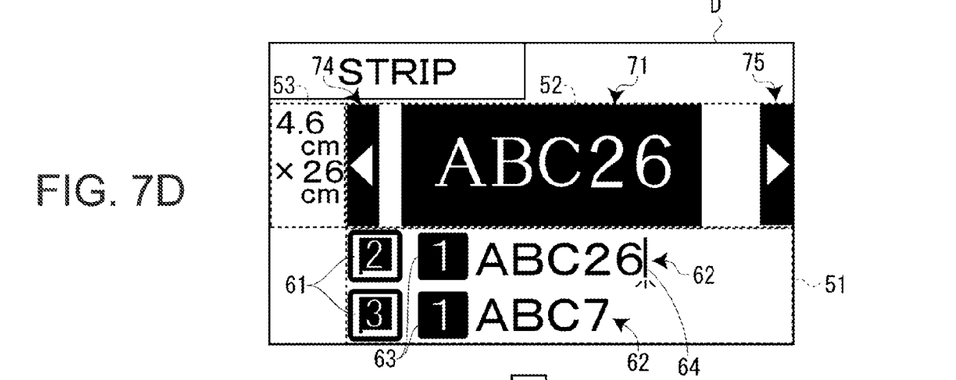
FIGS. 7D to 7F are screen transition views showing an example of transition of the editing screen in the latter half of the label preparation operation in the second embodiment.
Figure 7E:
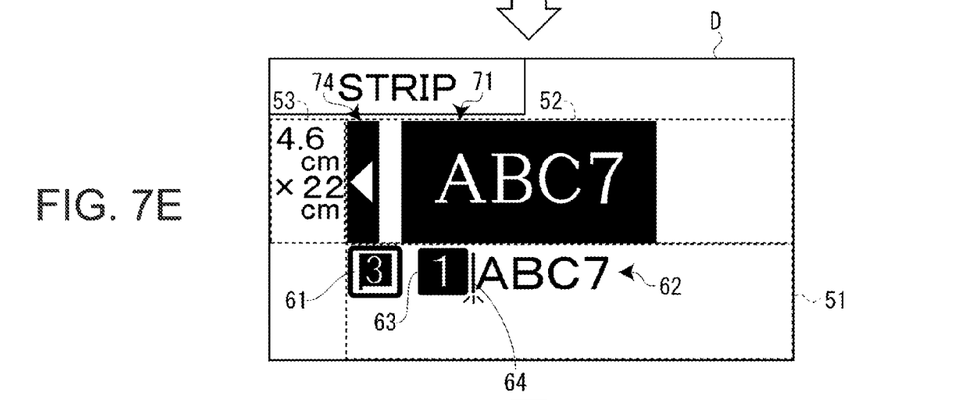
Figure 7F:
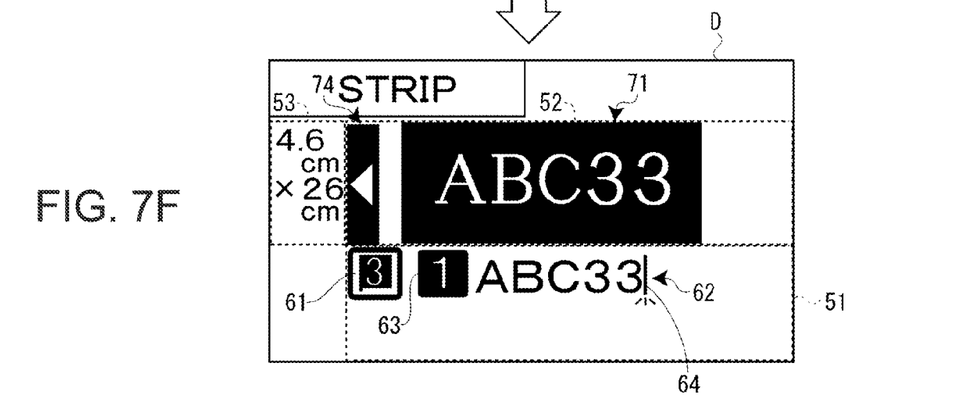

FIGS. 6A to 6C and FIGS. 7D to 7F are screen transition views showing an example of transition of the editing screen D in the label preparation operation in the second embodiment. In the label preparation operation in the second embodiment, as shown in FIG. 6B, if "ABC7" is inputted in the state where the first label is the editing target, the control unit 16 not only reflects this input content ("ABC7") on the print content 62 of the first label according to the editing screen display program 41 but also reflects this input content on the print content 62 of the second label and the print content 62 of the third label according to the editing result reflection program 81. As a result, at the time of editing the print contents 62 of the second label and the third label, the editing result of the first label is the initial value (see FIG. 6C and FIG. 7E). Therefore, at the time of editing the second label, it suffices to change "7" to "26" (see FIG. 7D). At the time of editing the third label, it suffices to change "7" to "33" (see FIG. 7F).

According to the embodiments, if there is a label immediately preceding the editing target label in the order, the left arrow object 74 is displayed on the forward end side of the preview image 71. If there is a label immediately following the editing target label, the right arrow object 75 is displayed on the rear end side of the preview image 71. With such a display, the user can intuitively and easily grasp whether or not there is any label preceding or following, in the order, the label currently being edited with the preview image 71 being displayed. Therefore, the editing work on each label can be carried out smoothly and the label preparation work can be carried out smoothly.

When the left cursor key 22c is pressed in the state where the cursor 64 is at the forward end position of the print content 62, the editing target label is switched to the immediately preceding label in the order. When the right cursor key 22d is pressed in the state where the cursor 64 is at the rear end position of the print content 62, the editing target label is switched to the immediately following label in the order. The editing target label can be switched by intuitive operations using the cursor keys 22c, 22d. Therefore, the editing work on each label can be carried out more smoothly.

Moreover, according to the configuration in the second embodiment, since the editing result of the first label is reflected on the second label and onward, the editing work on the second label and onward can be simplified and the label preparation work can be carried out more smoothly. For example, in the case of wanting to prepare a plurality of caution labels to draw attention to different things from each other, if the letters of "Warning!" or "Caution!" that are used in common are inputted at the time of editing the first label, there is no need to input these letters again for the second label and onward.

Figure 8:
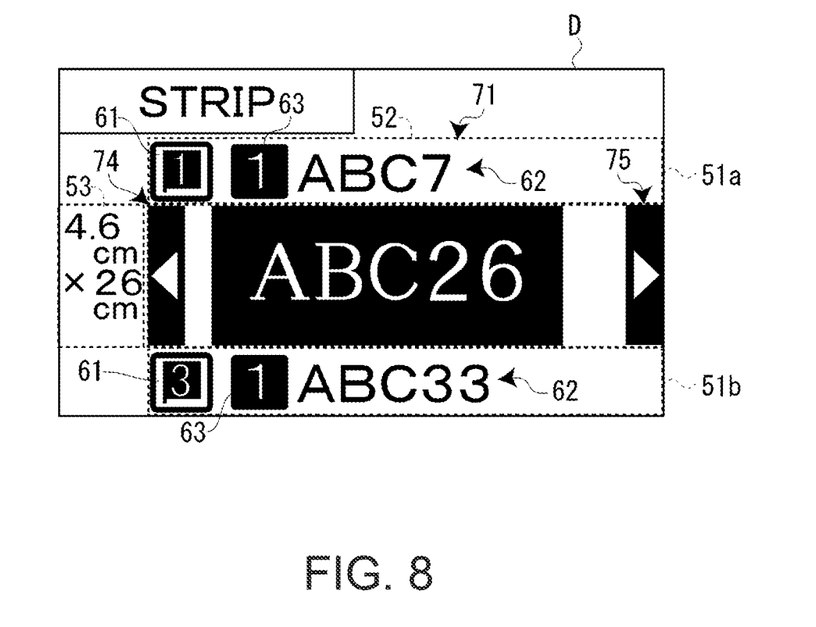
FIG. 8 shows a modification of the editing screen for the strip printing function.

In the embodiments, a configuration in which the print contents 62 of the labels preceding and following the editing target label in the order are displayed on the editing screen D may be employed. That is, as shown in FIG. 8, the editing screen D includes a preview display area 52 arranged in the center of the up-and-down direction in the screen, a first print content display area 51a arranged above the preview display area 52, and a second print content display area 51b arranged below the preview display area 52. In the preview display area 52, the preview image 71 of the editing target label is displayed. In the first print content display area 51a, the print content 62 of the label immediately preceding the editing target label in the order is displayed in a text format. In the second print content display area 51b, the print content 62 of the label immediately following the editing target label in the order is displayed in a text format. In this way, the control unit 16 displays the print contents 62 of the labels preceding and following the editing target label in the order as well as the preview image 71 in the editing screen D, according to the editing screen display program 41. According to this configuration, the user can grasp not only whether there is a preceding or following label or not, but also the print contents 62 of the preceding and following labels. Also, whether there is a preceding or following label or not can be grasped both from the display of the arrow objects 74, 75 and from the display of the print contents 62. Therefore, whether there is a preceding or following label or not can be grasped more easily and the editing work on each label can be carried out more smoothly. While the cursor 64 is not illustrated in FIG. 8, it is preferable in this configuration that the cursor 64 is displayed on the preview image 71 in the preview display area 52.

Although not mentioned in the embodiments, the number of labels prepared collectively by the strip printing function may be selected and set by the user or may be determined in advance. Also, the number of such labels may be increased or decreased by a specific operation on the editing screen D.

What is claimed is:

1. A label preparation device which can edit a print content of each of a plurality of labels and which prepares the plurality of labels on the basis of an editing result of the print content of each label, the device comprising:
   an operation unit;
   an editing target switching unit which switches an editing target label among the plurality of labels arranged in a particular order, in response to an operation on the operation unit; and
   an editing screen display unit which displays an editing screen including a print preview image of the editing target label, the print preview image showing a preview of the print content to be printed on the editing target label superimposed on a tape image of the editing target label at a position where the print content is to be printed on the editing target label;
   wherein
      if there is a label immediately preceding the editing target label in the particular order, the editing screen display unit displays a first object on a forward end side of the print preview image, the first object indicating that there is an immediately preceding label in the particular order,
      if there is a label immediately following the editing target label in the particular order, the editing screen display unit displays a second object on a rear end side of the print preview image, the second object indicating that there is an immediately following label in the particular order,
      each display position of the first object and the second object is superimposed on an area where the print preview image can be displayed, and
      if the print preview image is large and overlaps with the display position of the first object or the second object, the first object or the second object is not displayed.

2. The label preparation device according to claim 1, wherein
   the editing screen display unit displays a cursor indicating an editing position on the print content in the editing screen,
   the operation unit includes:
      a first cursor key which moves the cursor in a forward end direction of the print content; and
      a second cursor key which moves the cursor in a rear end direction of the print content, and
   when the first cursor key is pressed in the state where the cursor is at a forward end position on the print content, if there is a label immediately preceding the editing target label, the editing target switching unit switches the editing target label to the immediately preceding label, and
   when the second cursor key is pressed in the state where the cursor is at a rear end position on the print content, if there is a label immediately following the editing target label, the editing target switching unit switches the editing target label to the immediately following label.

3. The label preparation device according to claim 1, further comprising an editing result reflection unit which reflects an editing result of the print content of a first label in the particular order, of the plurality of labels, onto the print contents of the other labels.

4. The label preparation device according to claim 1, wherein the editing screen display unit displays the print content of the label preceding or following the editing target label in the particular order, with the print preview image, in the editing screen.

5. The label preparation device according to claim 1, wherein the editing screen includes:
   a print preview display area where the print preview image for the editing target label is displayed, and
   a print content display area which displays print content for the editing target label and an immediately following label or an immediately preceding label not currently displayed as the editing target label.

* * * * *